United States Patent [19]

Lemoine

[11] Patent Number: 5,156,926
[45] Date of Patent: Oct. 20, 1992

[54] SYSTEM FOR GENERATING ELECTRIC ENERGY FROM FUELS HAVING ELECTROCHEMICALLY ACTING FUEL CELLS

[75] Inventor: Joseph Lemoine, Friedrichshafen, Fed. Rep. of Germany

[73] Assignee: MTU Friedrichshafen GmbH, Friedrichshafen, Fed. Rep. of Germany

[21] Appl. No.: 450,567

[22] PCT Filed: Apr. 5, 1989

[86] PCT No.: PCT/DE89/00209

§ 371 Date: Nov. 16, 1990

§ 102(e) Date: Nov. 16, 1990

[87] PCT Pub. No.: WO89/10010

PCT Pub. Date: Oct. 19, 1989

[30] Foreign Application Priority Data

Apr. 16, 1988 [DE] Fed. Rep. of Germany ....... 3812812

[51] Int. Cl.$^5$ .............................................. H01M 8/06
[52] U.S. Cl. ........................................ 429/19; 429/17; 429/20; 429/26
[58] Field of Search .................... 429/17, 19, 20, 26, 429/34

[56] References Cited

U.S. PATENT DOCUMENTS

| | | |
|---|---|---|
| 3,359,134 | 12/1967 | Salvadori et al. |
| 3,576,677 | 4/1971 | Keating et al. |
| 3,736,187 | 5/1973 | Harrison et al. |
| 3,785,870 | 1/1974 | Winsel ............................. 429/20 |
| 4,128,700 | 12/1978 | Sederquist ....................... 429/19 |
| 4,344,849 | 8/1982 | Grasso et al. .................. 429/20 X |
| 4,532,192 | 7/1985 | Baker et al. ................... 429/17 X |

FOREIGN PATENT DOCUMENTS

| | | |
|---|---|---|
| 0071967 | 2/1983 | European Pat. Off. |
| 0180941 | 5/1986 | European Pat. Off. |
| 1496303 | 5/1965 | Fed. Rep. of Germany . |
| 1961017 | 7/1970 | Fed. Rep. of Germany . |
| 1496286 | 8/1970 | Fed. Rep. of Germany . |
| 1671963 | 3/1972 | Fed. Rep. of Germany . |
| 2604981 | 8/1976 | Fed. Rep. of Germany . |
| 1436747 | 3/1966 | France . |
| 2132049 | 11/1972 | France . |
| 60-165063 | 8/1985 | Japan . |
| 60-207257 | 10/1985 | Japan . |

OTHER PUBLICATIONS

Enzyklopädie Naturwissenschaft und Technik, vol. 1(A-D) pp. 585-593 by Brennstoffzelle.
Int. J. Hydrogen Energy, vol. 8, No. 7, pp. 499-508 (1983) by B. R. Krasicki & B. L. Pierce.

*Primary Examiner*—Anthony Skapars
*Attorney, Agent, or Firm*—Barnes & Thornburg

[57] ABSTRACT

The invention relates to a system for generating electric energy from fuels by means of electrochemically acting fuel cells. In order to achieve an operation of a system which is efficient and not harmful to the environment, heat exchangers and at least one gas washing unit are coupled to the fuel cells. The heat exchanger is constructed such that the heat quantities occurring during the process are reutilized for the operation of the fuel cells. The gas washing unit is used for the precipitation and recovery of residual fuel components contained in the fuel waste gas and of expensive catalyst gas which are recycled to the fuel cells. An additional gas washing unit and additional precipitating unit are controlled by a microprocessor to increase the efficiency of the system while energy is generated in a manner which leaves practically no residues and is not harmful to the environment.

12 Claims, 1 Drawing Sheet

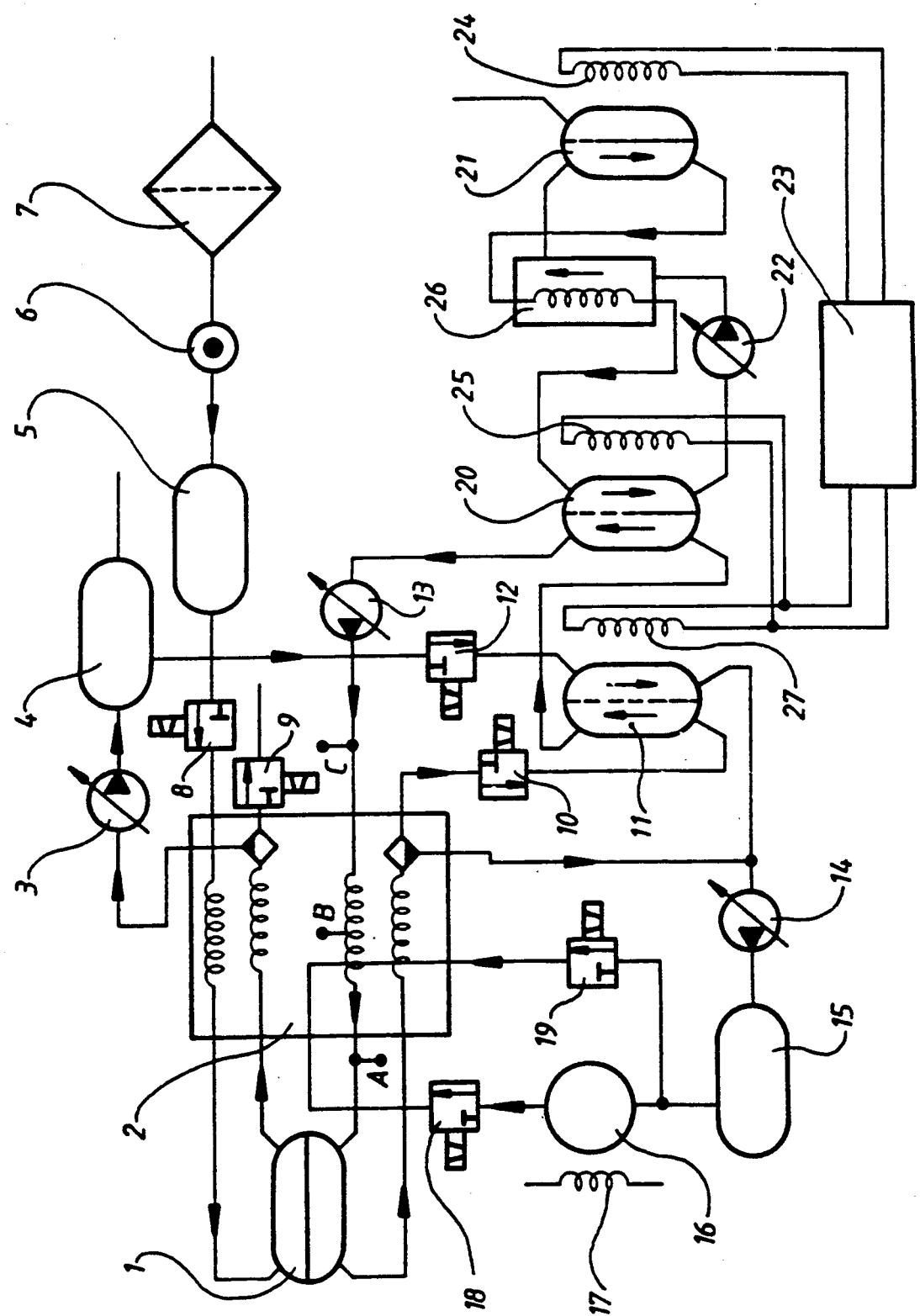

SYSTEM FOR GENERATING ELECTRIC ENERGY FROM FUELS HAVING ELECTROCHEMICALLY ACTING FUEL CELLS

BACKGROUND AND SUMMARY OF THE INVENTION

The invention relates to a system for generating electric energy from fuels having electrochemically acting fuel cells with arrangements for the feeding and removing of the reacting substances and of the reaction products to and from reaction spaces on the surfaces of the electrodes of the fuel cells. A heat exchanger is provided for regulating the heat and for processing the substance flows into and out of the fuel cells.

Such a type of system is known from the encyclopedia "Naturwissenschaft und Technik" ("Natural Science and Technology"), Zweiburgen-Verlag Weinheim, Volume 1, 1979, Pages 585-593, as the current state of the art. Here a fuel cell is formed by two electrodes serving as the catalyst which are separated from one another by means of an electrolyte. Conventional fossil fuels are used as fuel for the fuel cell. A mixture of water vapor, fuel vapors and a catalyst gas is supplied at the fuel electrode which results in the generating of carbon dioxide, hydrogen ions and electrons. The hydrogen ions travel through an electrolyte to the air electrode, at which location combustion air is supplied and where water vapor is generated in a hydrogen ion/oxygen reaction. In order to achieve higher electric outputs, stacks of fuel cells are formed which are connected in series. For the operation of such fuel cells, devices are naturally required for feeding and removing the reactive substances and the reaction products to and from the spaces bordering on the electrode surfaces as well as devices for controlling the heat, e.g. heat exchangers. The systems which are currently operative have not exceeded individual limited special applications because of low efficiency. The reason is that no consequent reprocessing and reuse of the substances participating in the process and utilization of occurring heat quantities has taken place.

The invention is based on the object of providing a system for generating electric energy which is based on the use of fuel cells, which have a high efficiency and which can be operated in an economical and environmentally advantageous manner.

In the case of a system of this type, this object is achieved by a heat exchanger assigned to the fuel cell which is used for the cooling of the substance flows carried away from the fuel cell and for the precipitation of the condensates contained therein. The heat exchanger uses the resulting obtained heat for heating and evaporating of the substance flows to be supplied to the fuel cell. A gas washing unit is used for the separation of catalyst gas used in the fuel cell and residual fuel components from fuel gases removed from the fuel cell. These separated elements are fed back into the fuel cells. By means of suitable heat exchangers and arrangements, heat quantities occurring in the process are reutilized for the heating of the substance flows to be fed to the fuel cell. Other system parts have the purposes of: purifying the fuel gases occurring during the fuel reaction by means of gas washing units, and of returning the residual fuel components to the fuel cells and of recovering expensive catalyst gases.

It is advantageous if a second gas washing unit is provided in which the carbon dioxide contained in the fuel gases is dissolved and removed in a transport fluid, and wherein a residual gas mixture is precipitated out and through suitable arrangements is also fed back into the fuel cell. The precipitation apparatus provides for the reprocessing of the transport fluid with the emission of carbon dioxide to the ambient air. The transport fluid is guided in a closed loop between the gas washing unit and the precipitating apparatus. A heat exchanger is provided for the heat exchange between the fluid flows. Also, regenerating apparatus is provided for regenerating the residual catalyst gas and for separating poisonous gases from the transport fluid.

It is further advantageous to have a heat pump which is used for the cooling of the gas washing units by way of the heat exchangers and which makes available the regenerated heat for the heating of a vapor generator and the precipitating apparatus for the reprocessing of the transport fluid. Combustion air flow is controlled by valves in the supply and discharge line to the fuel cell. The flow of the fuel gas mixture to the fuel cell is controlled by a valve in the discharge line leading to the gas washing unit and by controlling the generating of vapor by means of a vapor generator in the supply line. here fuel injection is controlled by means of an arrangement for measuring the cell voltage.

It is also desirable to have the fuel cells arranged in stacks wherein at least the gas mixture containing the fuel is guided successively through the individual fuel cells of the stack in a serpentine course. The supplying of water to the fuel-gas-mixture-side electrode of the fuel cell is controlled as a function of its concentration in the fuel condensate which is precipitated in the heat exchanger. Microprocessor controlled pumps and valves are provided for the feeding and removal of the substance flows to and from the fuel cell.

Other objects, advantages and novel features of the present invention will become apparent from the following detailed description of the invention when considered in conjunction with the accompanying drawings

BRIEF DESCRIPTION OF THE DRAWINGS

The sole FIGURE shows a schematic representation of the overall configuration of a system with an electrochemical fuel cell for generating electric energy.

DETAILED DESCRIPTION OF THE DRAWINGS

The device shown in the FIGURE is used for the direct electrochemical conversion of chemical energy from fuels into electric energy. The device can be used for the conversion of energy from most conventional fuels, such as diesel oil, kerosene, benzene, various alcohols and also butane, propane and methane. The apparatus operates with air as the oxidant at an operating temperature of between 120 degrees C. and 250 degrees C. A mixture of water vapor, fuel vapors and a catalyst gas is supplied to the fuel electrodes of the fuel cell core which may be formed from a number of individual fuel cells 1 arranged in stacks. As a result of the electrode reaction, protons are formed on the surface of the fuel electrode which, while carrying the current, move through an electrolyte to the air electrode and discharge there in a proton/oxygen reaction and are converted to water vapor. Protons form at the fuel electrode in a reaction chain, in which case water vapor is consumed and the fuel is converted to carbon dioxide.

When the air oxygen and the fuel are completely used up, the exhaust gases will therefore consist of a nitrogen/water vapor mixture (spent air), or of a water vapor/catalyst gas/carbon dioxide mixture (spent fuel).

The combustion air and the combustion gas mixture must be heated to the required temperatures. For starting the system, a heating device having a vapor generator 16 is required, by means of which the fuel cell 1 must be subjected to additional heating. During the operation, the fuel cell 1 produces a sufficient amount of heat as a result of losses in order to maintain its own operating temperature. For this purpose, a heat exchanger 2 is used in which the heat, obtained from cooling the substance flows discharged from the fuel cell 1 and the condensation heat generated by the precipitation of condensates, is formed for the heating and evaporation of the substance flows to be supplied to the fuel cell 1. Part of the heat must even be removed, which can be achieved by way of the gas washing units 11 and 20 to be explained later and possibly additional cooling fluid in the heat exchanger 2. In addition, a heat pump 23 may be used for controlling the operating temperature. By means of the formation of condensates in the heat exchanger 2, the gas washing units 11 and 20 are relieved. The condensates formed in the heat exchanger 2 from the fuel gases are taken in by a pump 14 and are reinjected in a closed loop into the flowing-in fuel gas mixture in the heat exchanger 2. A part of this condensate is stored in a condensate tank 15 and, in a regulated manner, is supplied to a special vapor generator 16. As a result, the pressure of the fuel gases is regulated.

The condensate which is the result of the spent combustion air consists of pure water which partly is needed in the gas washing unit 11, and partly must be removed as a waste product. In the process, considerably more water is produced in the air space than is used up in the combustion space.

The gas washing unit 11 is used for the separation of catalyst gas and residual fuel components from the fuel gases removed from the fuel cells 1. In a closed loop, the catalyst gas and the residual fuel components are again fed into the fuel cells 1. The mentioned substances are washed out of the gases with water according to the counterflow principle since the acidic intermediate products would have an unfavorable effect on the basic transport fluid of the washing system 20.

The additional gas washing unit 20 is used for the separation of carbon dioxide from the residual gases coming out of the gas washing unit 11. The carbon dioxide is dissolved in a transport fluid and is removed from the residual gas mixture. In a closed loop, the residual gases are fed back into the fuel cell 1 by way of a pump 13. A fluid is used as the transport fluid which strongly binds the carbon dioxide at a low temperature, but completely releases it again at a higher temperature. The heat exchangers 25 and 27 are used for the cooling of the gas washing unit 11 and 20.

An apparatus 21 for precipitating the carbon dioxide to the atmosphere is used for the reprocessing of the transport fluid. In the apparatus 21, the transport fluid is heated by means of a heat exchanger 24. The transport fluid circulates in a closed loop between the gas washing unit 20 and the apparatus 21, a heat exchanger 26 being provided for regulating the heat. The transport fluid, in the heat exchanger 26, is heated with the regenerated transport fluid according to the counterflow principle.

When the washing unit 11 is overdimensioned, one can not be avoid residual traces of the catalyst gas from reaching the washing system 20 and gradually blocking the transport fluid there. In addition, fuels usually are not free of sulfur. The sulfur, in the form of sulfur dioxide, finally reaches the washing unit 20 and also blocks the transport fluid. Because of their highly acidic character, the catalytic acid and the sulfur dioxide are not expelled by heating. For this reason, an additional apparatus which is not shown, however, may be required in the case of the corresponding fuels in order to separate and remove both components from the transport fluid. This type of a technique is known. An apparatus of this type is not necessary if, by exchanging the transport fluid during a servicing operation, new transport fluid is filled in. The removed transport fluid may then be reprocessed in a chemical plant.

A heat pump 23 is used for cooling the gas washing units 11 and 20 to a temperature which is slightly above the freezing point. The regenerated heat is used for the heating of the vapor generator 16 and of the apparatus 21 for the reprocessing of the transport fluid. The waste heat of the system is discharged to the atmosphere or to a consuming device.

A microprocessor is used for the control of the gas flows and the fluid flows as well as for the control and monitoring of the operating temperatures and for maintaining operational safety criteria. All valves and pumps are microprocessor-controlled. The air supply of the fuel cells 1 takes place by means of an air filter 7, a compressor 6, an air tank 5 as well as valves 8 and 9. A pressure is maintained in the air space of the fuel cell 1 which is equal to the pressure in the fuel space and is specified by the strength of the cell construction by means of valves 8, 9, controlled by a microprocessor. The flow rate is regulated such that is slightly exceeds the theoretically required value.

The flowing-through of the fuel gases is controlled by actuating the valve 10 and by controlling the generating of vapor in the vapor generator 16. When valve 10 is shut, a vacuum is generated in the gas washing units 11 and 20 which, when valve 10 is opened, sucks the fuel gases out of the fuel cell 1 through the heat exchanger 2. The pressure in the fuel space is built up again by the vapor generator 16 in connection with valves 18 and 19 and by the injection of fuel. The pump 14 and the injecting of condensate into the heat exchanger 2 provides a closed loop. The flowing-through of the fuel gases is controlled independently of the injection of fuel since the partial pressure of the fuel may vary within wide limits.

At the points marked by the letters A, B or C, the fuel injection may take place according to the volatility of the used fuel. Advantageously, the fuel gas mixture to be supplied flows successively through the fuel cells 1 arranged in stacks. The fuel cell voltage is a function of the logarithm of the partial pressure of the fuel. The difference of the fuel cell voltages of a first and a last group in the serpentine flow, however, can easily be measured and, as a result, the depletion of the fuel can be precisely determined. Therefore, the measuring of the fuel cell voltages is used for controlling the fuel injection such that almost all the supplied fuel is used up. Since only little excess fuel is discharged with the fuel gases, the gas washing units 11 and 20 suffer little stress.

Water is used up in the fuel electrode which is taken from the washing water of the gas washing unit 11. The water is added to the condensate supplied in the heat exchanger 2. The supplying of water is controlled such that its concentration in the fuel condensate remains constant.

By means of the control of the pump 22 and by means of the control of the heat pump 23, the precipitation of carbon dioxide from the transport fluid can be controlled. The rate of flow is controlled according to the content of carbon dioxide at the outlet of the gas washing unit 11 or in the transport fluid.

The microprocessor used for controlling the working process is also used for monitoring the pressures, indicating whether a sudden pressure drop occurs during a breaking of the cell structure, or whether catalytic acid occurs in the air condensate when there is a leakage in the fuel cell, or whether the temperatures are maintained. In the case of a malfunctioning, safety valves (not shown) are opened. The safety valves have the effect that the pressures in both cell halves are equalized in order to displace the gases located there by a safety gas, such as nitrogen or carbon dioxide. In the inoperative condition of the system, the fuel cells 1 are filled with this gas. It is only when the system is started, that this gas is gradually displaced by vapor from the vapor generator 16 and air from the compressor 6.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A system for generating electric energy from fuels with electrochemically acting fuel cells, having arrangements having reacting substances and feeding and removing means for delivery of the reaction products to and from reaction spaces at surfaces on electrodes of the fuel cells and heat regulating means and substance flow processing means for controlling heat and flow of substances to and from the fuel cell comprising:
    a heat exchanger means for withdrawing heat and cooling substance flows carried away from the fuel cell and for precipitation of condensates contained therein;
    said heat exchanger means using the withdrawn heat for heating and evaporating of substance flows to be supplied to the fuel cell;
    a gas washing unit means for separating catalyst gas from the substance flows carried away from the fuel cell and for separation of residual fuel components from the substance flows removed from the tank;
    and means for feeding the separated exhaust gas and residual fuel components back into the fuel cells.

2. A system according to claim 1, wherein a second gas washing unit means is provided for dissolving carbon dioxide contained in the substance flow removed from the fuel cell;
    a precipitating means for precipitating out a residual gas mixture from the second gas washing unit means;
    return means for returning the residual gas mixture back into the fuel cells.

3. A system according to claim 2, wherein the precipitating means reprocesses the dissolved carbon dioxide to the ambient air;
    and wherein the substance flow from the fuel cell is in a closed loop and is guided between the second gas washing unit means and the precipitating means to the heat exchanger means for the heat exchange between the substance flows.

4. A system according to claim 3, wherein the precipitating means is provided for regenerating the residual catalyst gas and also separates out poisonous gases from withdrawn substance flow.

5. A system according to claim 1, wherein a heat pump means is provided for withdrawing heat and cooling the gas washing units means through heat exchangers, and wherein this withdrawn heat is utilized for heating of a vapor generator used to heat the heat exchanger and the precipitating means.

6. A system according to claim 1, wherein there is an air supply means for supplying and controlling a flow of air to the fuel through a first valve means in the supply and discharge line to the fuel cells.

7. A system according to claim 1, wherein the substance flow from the gas washing unit means to the fuel cell is controlled by a second valve means in a discharge line leading to the gas washing unit and by controlling a generating of vapor by means of a vapor generator means for heating the heat exchanger.

8. A system according to claim 6, wherein the substance flow from the gas washing unit means to the fuel cell is controlled by a second valve means in a discharge line leading to the gas washing unit and by controlling a generating of vapor by means of a vapor generator means for heating the heat exchanger.

9. A system according to claim 1, wherein a fuel injection means controls fuel injected into the fuel cells in response to fuel cell voltage.

10. A system according to claim 1, wherein the fuel cells are arranged in stacks and wherein at least a gas mixture containing fuel from the fuel cells is led in a serpentine course through individual fuel cells of the stack.

11. A system according to claim 1, wherein control means are provided for the supplying of water to the fuel-gas-mixture-side electrode of the fuel cell as a function of water in the substance flow from the fuel cell that goes to the heat exchanger means.

12. A system according to claim 1, wherein the various feeding and removing means are controlled by a microprocessor.

* * * * *